United States Patent
Northrop

Patent Number: 5,626,644
Date of Patent: May 6, 1997

[54] STORM WATER REMEDIATORY BIOCONVERSION SYSTEM

[75] Inventor: Jere Northrop, North Tonawanda, N.Y.

[73] Assignee: Bion Technologies, Inc., Amherst, N.Y.

[21] Appl. No.: 541,320

[22] Filed: Oct. 10, 1995

Related U.S. Application Data

[63] Continuation of Ser. No. 165,172, Dec. 13, 1993, abandoned, which is a continuation-in-part of Ser. No. 120,164, Sep. 10, 1993, Pat. No. 5,472,472.

[51] Int. Cl.$^6$ .................................. C05F 3/00; C02F 3/02
[52] U.S. Cl. ........................ 71/9; 71/10; 71/13; 71/15; 71/24; 210/602; 210/607
[58] Field of Search .......................... 71/9, 10, 13, 15, 71/24; 210/602, 607, 616, 618, 673

[56] References Cited

U.S. PATENT DOCUMENTS

| | | | |
|---|---|---|---|
| 3,676,334 | 7/1972 | Zuckerman et al. | 210/9 |
| 5,078,882 | 1/1992 | Northrop | 210/602 |
| 5,472,472 | 12/1995 | Northrop | 71/9 |

*Primary Examiner*—Ferris Lander
*Attorney, Agent, or Firm*—Crossetta & Associates

[57] ABSTRACT

The invention relates to a improved process for the biological transformation of phosphorus and nitrogen containing storm water runoff into ecologically manageable materials by a process wherein aqueous storm water runoff is passed to a bioreactor where soluble phosphorus is precipitated with metallic salts, the aqueous fluid is aerobically and anaerobically treated to form an active biomass that actively bioconverts remaining soluble phosphorus and nitrogen, and the aqueous fluid containing bioconverted phosphorus and nitrogen is passed to an ecoreactor wherein at least a portion of the biomass is bioconverted to a beneficial humus material.

9 Claims, 1 Drawing Sheet

STORM WATER REMEDIATORY BIOCONVERSION SYSTEM

This is a continuation of application Ser. No. 08/165,172 filed on Dec. 13, 1993 and now abandoned, which is a continuation-in-part of U.S. application Ser. No. 08/120,164 filed Sep. 10, 1993 now U.S. Pat. No. 5,472,472, Dec. 5, 1995.

The invention relates to an improved process for the biological transformation of nutrients and other organics, as measured by BOD (biological oxygen demand), collected through storm water runoff, into ecologically manageable materials.

BACKGROUND OF THE INVENTION

One particularly distressing abuse to the world ecosystem is the corruption being wrought upon the fresh water system of the Earth by the collection and intensification of nutrients, particularly nitrogen, phosphorus, other organics (hereafter referred to as BOD), suspended solids and organic toxins, through storm water runoff from municipal, transportation, agricultural, commercial and the like operations.

Modern agricultural practices have detrimentally effected the ecological balance of traditional farming. The efficiency of agriculture has changed, with modern fertilization and crop protection application techniques concentrating larger amounts of nutrients, BOD, toxins and the like under conditions which improve farming and are generally non-interactive with the adjacent surrounding environment, but which are vulnerable to periodic displacement and runoff with surface and ground water movement during rainfall and the like. Thus, it is a common occurrence during and after significant snow or rainfall that nutrients, particularly nitrogen and phosphorus, BOD and the like that may have been applied or have been concentrated in orchards, fields or the like, or may be contained in waste excrement at animal farms such as dairy and cattle farms or the like, are carried by the movement of storm water runoff to collect in areas where such pollutants are particularly susceptible to entry into the local surface waters and fresh water aquifer and thus become a threat to the fresh water supply.

Modern highway systems, municipalities, industry and the like, generally purposefully provide for the collection and movement of rainwater runoff from an immediate area of human inconvenience, to an area where human inconvenience is less immediate. Generally such systems make no provision for treatment of the runoff and direct the flow thereof to low lying areas, streams or rivers which may be particularly susceptible to entry of the runoff into the local surface waters and fresh water aquifer and thus the pollution thereof by nutrients, BOD, toxins and other pollutants which are generally carried with the runoff.

Many waste water treatment facilities and the like are susceptible to the effects of intense rain storms and it is not unusual that concentrations of nutrients, BOD and the like are carried with storm runoff from such facilities to adjacent low lying areas which are particularly vulnerable to polluting local surface waters and fresh water aquifers.

The problem of fresh water pollution by nutrients and BOD content may be exacerbated by an accompanying concentration of toxic materials. Concentrations of toxic materials, which may have been used as insecticides or herbicides, including heavy metals and the like, may be typically part of the storm water runoff and end up being carried along with nutrients, BOD and the like to the surface waters and fresh water aquifer, thus spreading the pollutants through the environment and further de-stabilizing the local ecosystem.

Various solutions which have been proposed to solve the ecological problem posed by storm water runoff, but have been judged to be incomplete or so specialized that they only serve to change or postpone the problem.

For example, in the animal farming industry, it has been proposed that complex systems be installed to provide manageable manure slurries and that systems be installed by the farmer to enable spraying the manure slurry on differing land areas in a rotating manner to reduce the impact of concentration. It has also been proposed to isolate manure in depositories secure from rain water run-off until the decaying process has produced a concentrated desirable humus which then can be commercially sold or otherwise distributed to non-impacted localities. Both of these proposals present odor problems, require constant manpower to accomplish, do not significantly resolve the migration problem of un-stabilized phosphorus, nitrogen and BOD and have not enjoyed significant success.

Similarly, it has been proposed to construct expensive holding tanks which collect storm water runoff from highways, municipalities and the like and thereafter direct such to traditional waste treatment plants along with raw sewage and the like. Such systems are prohibitively expensive and except in isolated circumstances have generally not been found to be economically feasible.

The present invention addressees the problems associated with handling storm water runoff by providing a means to resolve ecological problems associated with the migration of nutrients, BOD and the like, through the efficient bioconversion of polluting materials at or adjacent to the offending site, into stable, economically and/or ecologically beneficial materials.

Thus, it is an object of the invention to provide an ecologically suitable means for managing storm water runoff.

It is another object to provide an improved process for the biological transformation of nutrients, BOD, toxins or other waste materials, from storm water runoff, into economically suitable materials.

It is a further object of the present invention to provide a process to create a biologically active, ecologically stable, humus material through the bioconversion of nutrients and BOD from storm water runoff.

It is a still further object of the present invention to provide a process to create a biologically active, and/or a nutrient-rich, organic soil from storm water runoff.

These and other objects will be apparent from the following description of the invention.

SUMMARY OF THE INVENTION

The present invention comprises a process for the treatment of storm water runoff containing nutrients and BOD through an integrated biological and chemical process comprising a microbial growth zone or bioreactor and a managed wetland ecoreactor. The process is particularly applicable to the treatment of various forms of nitrogen, phosphorus and other nutrients, suspended solids and BOD.

In the process of the invention, storm water runoff from commercial, agricultural, municipal or the like operations, containing significant concentrations of soluble phosphorus and nitrogen materials and other organic biodegradable materials, as measured by biochemical oxygen demand, are biologically transformed into ecologically stable humus materials and/or nutrient rich organic soils which have economic commercial value and can safely be maintained in open storage. The process also manages the water which is combined with the pollutants and provides a clean, generally low nutrient water discharge, which can safely enter the local fresh water aquifer.

The process of the invention comprises treatment of the storm water runoff in two primary subsystems or zones: a bioreactor and an ecoreactor.

In one embodiment of the process, storm water runoff containing concentrations of phosphorus, nitrogen, BOD and the like is directed to a bioreactor. The bioreactor is generally comprised within a suitably sized holding pond environment or the like, which contains an inlet end for receiving the aqueous storm water runoff and an outlet end for discharging treated effluent. The bioreactor holds the storm water runoff for a time sufficient to at least initiate treatment and allow discharge, in a controlled manner, of a treated effluent fluid containing a multitude of active, naturally occurring bacterial species especially predisposed to nutrient capture and assimilation, through its outlet to an ecoreactor.

The bioreactor contains a diverse microbial biomass which effects the treatment, having anaerobic, aerobic and facultative bacterial populations generally concentrated in corresponding zones, with the anaerobic zone generally arranged close to the inlet end of the bioreactor. The anaerobic zone is generally defined by the character and volume of influent. In a preferred embodiment the bioreactor generally comprises means to precipitate out insoluble pollutants and an aerator generally positioned to enhance formation of aerobic and facultative microbial populations. The precipitating means is generally a physical chemical process which additionally conditions potential phosphorus values for recovery as phosphorus complexes in the ecoreactor. The aerator is generally a mechanical device or a construction which is arranged to provide aeration to and enhance mixing of the aqueous storm water influent within the bioreactor. Aeration can be by natural aerating means, such as placement of weirs, baffling and other fluid disturbing devices and the like and/or judicious placement of flora which create and enhance an intermingling flow of fluids within the bioreactor.

The chemical addition/mixing subzone, associated with the bioreactor, is generally positioned for mixing metallic salts with the storm water runoff influent for the removal of precipitatable phosphorus in an influent zone at about the influent end of the bioreactor. Preferred metallic salts for treating the storm water runoff influent include ferrous sulfate, ferric chloride, alum and the like which can combine with suspended and/or solubilized phosphorus compounds to form a precipitate and/or associated chemical complexes.

The bioreactor is sized to hold the storm water runoff for a time sufficient to enable the growth, or at least the intermixing therewith and initial growth of survivable facultative microbial populations before discharge of treated fluid to the ecoreactor.

The ecoreactor generally constitutes a flooded vegetative complex and comprises a wetlands environment made up of plants and microorganisms adequate to capture unwanted substances which may be comprised in the effluent discharged from the bioreactor and sized to receive a volume of effluent discharge to a depth which will not impair the growth of the facultative microorganisms and plants contained therein. The ecoreactor is generally positioned adjacent the bioreactor and receives the effluent from the bioreactor by gravity flow or pumping means which are arranged such that liquid discharged from the bioreactor can be directed thereto in a variable and controlled manner. A preferred ecoreactor zone generally comprises a suitable low lying field arranged so that effluent from the bioreactor preferably flows in sheet manner within the ecoreactor, at low velocity, maximizing the distribution of the facultative microorganism-containing effluent throughout the ecoreactor boundaries. Weirs, baffles and/or berms may be arranged to divide the ecoreactor into separate cells to which the effluent from the bioreactor may be directed in correlation with the flow and or volume of storm water runoff which is being handled by the bioreactor.

In a preferred embodiment, the outlet of the bioreactor is configured to enable liquid discharge from the bioreactor to be directed to a first cell of the ecoreactor capable of supporting various aquatic vegetation and from time to time allow discharge from the bioreactor to be directed to one or more other cells so that the first cell may be dried, harvested and eventually reactivated with discharge from the bioreactor.

In the process of the invention, the bioreactor and ecoreactor may further comprise secondary subsystems which are cyclically connected by a series of recycle flows and organism movements to bioconvert materials contained therein.

The bioconverted materials produced by the process can be desirable and ecologically beneficial end products comprising entrained nitrogen and phosphorus such as biologically active and highly beneficial humus materials and/or nutrient rich organic soils. Generally, water effluent from the ecoreactor is sufficiently pollutant free to allow discharge thereof into a natural receiving water.

DETAILED DISCLOSURE OF THE INVENTION

Figure 1:
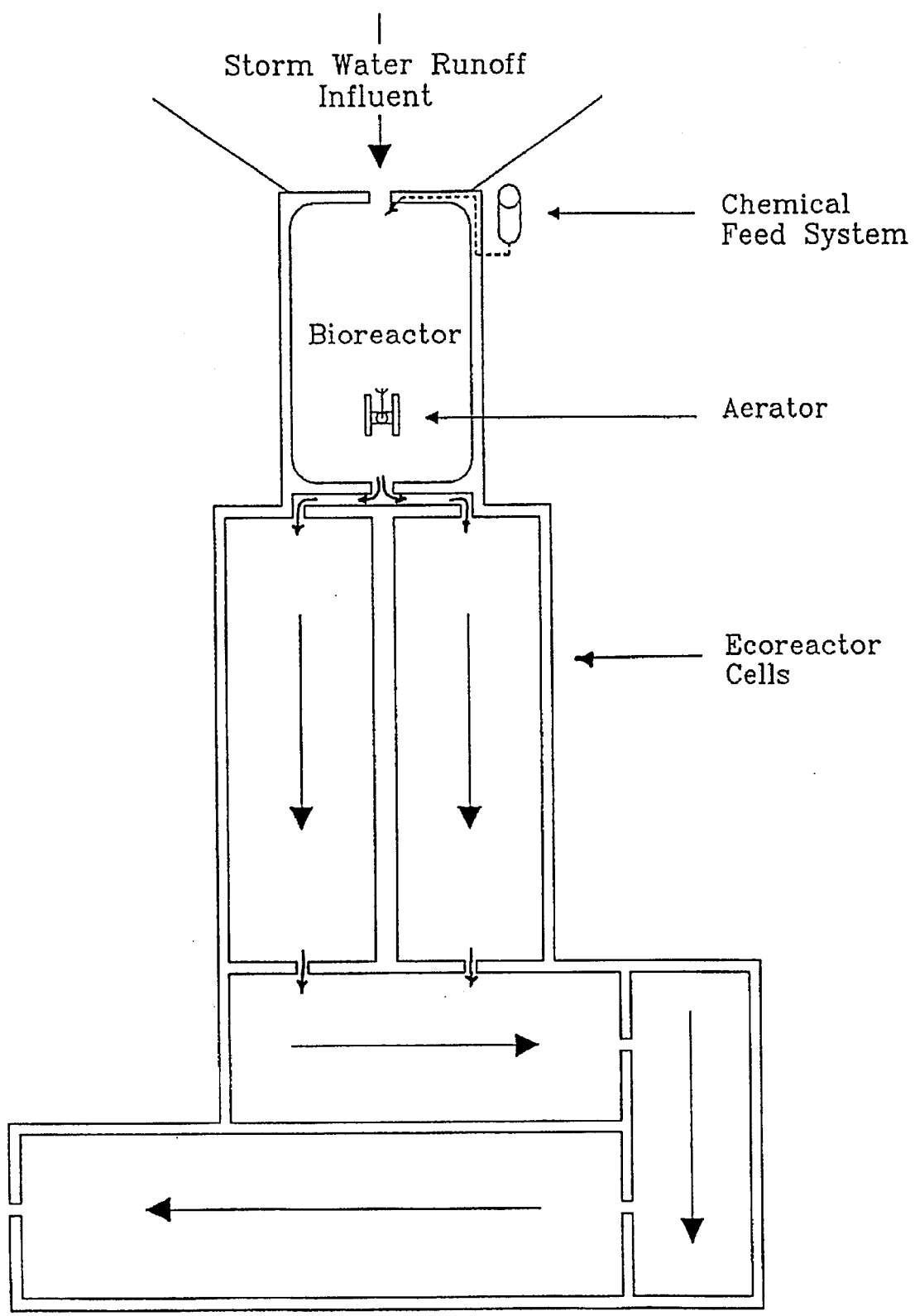
FIG. 1 comprises a flow diagram of an embodiment of the process of the invention.

The novel process of the invention involves bioconversion of nutrient containing storm water runoff into economically desirable or ecologically neutral materials. The novel process utilizes a combination of chemical precipitation and natural living systems such as microbes and plants to achieve bioconversion and exploits the creative capability of living organisms to adapt, to achieve the bioconversion and capture of nitrogen, phosphorus and BOD organic materials.

The two primary zones of the process, e.g. the bioreactor and ecoreactor, function as a part of an integrated, multiple recycling input/output flow through system, with removal of precipitatable phosphorus at desired locations being mediated by a chemical addition subsystem.

The process functions under the overall guidance of complementary, operational control strategies. One control strategy comprises imposing general biological control, based on extension of the maximum entropy principle, to optimize the system. Such strategy emphasizes the moderation of dynamic environmental extremes, the maintenance of suitable nutritional balances, and the artificial alteration of physical, chemical and biological sub-environments. Another control strategy comprises controlling the communication/transport of fluids so as to optimize the covariance of all information, material and chemical exchanges among various components of the system as a whole.

Referring now to FIG. 1. Therein, nutrient rich, generally aerated, storm water runoff, containing concentrations of nitrogen, BOD organics, phosphorus and the like is introduced to a first end of bioreactor, having a chemical precipitant feed system arranged at about the inlet thereto which feeds chemical precipitant to the moving influent thus providing convenient mixing therewith. The bioreactor comprises a structurally contained and physically controlled chemical precipitation and/or microbial growth zone, its principle function being to condition the influent by attaching undesirable soluble materials such as soluble phosphates, nitrogen compounds and toxins to living aggregates of biomass and chemical complexes so as to further the bioconversion process through the association of the undesirable material with microbial physiological processes.

The influent storm water runoff is further aerated in the bioreactor and a conditioned and aerated fluid stream flows from the bioreactor into an adjacent ecoreactor cell. Depending upon the amount of storm water runoff being handled by the process of the invention, the conditioned and aerated fluid may stand in the ecoreactor cell with complexed phosphorus and nitrogen compounds being assimilated therein and water being evapotransported therefrom or the conditioned and aerated fluid may flow to a further interconnected ecoreactor cell and so forth until the volume of fluids being handled is in stabilized confinement or discharged. The embodiment of FIG. 1 shows a separation of the fluid flow from the bioreactor to adjacent ecoreactor cells, and recombination and flow through to subsequent cells. It should be understood that any suitable arrangement of ecoreactor cells is contemplated as within the process of the invention including diverse combinations and recombination.

A bioreactor generally comprises multiple diverse subenvironments, including aerobic zones, anoxic and/or anaerobic zones, facultative bacteria zones, chemical addition zones, mixing zones, chemical complex formation zones, quiescent zones and settling zones, and it usually comprises one or more recycles among the various zones. A suitable bioreactor generally comprises a pond or the like fluid holding area and though not required, preferably includes a suitable lining of artificial or natural materials that generally resist the flow of fluids therethrough and maintain the integrity of the bioreactor.

Preferably the bioreactor is configured to maintain at least a minimal flow there within and can comprise an agitating means or the like and/or an aeration means. The bioreactor is designed to contain both aerobic and anaerobic zones and no attempt is made to achieve clarity of the effluent from the bioreactor, as excess nutrient or other contaminant complexes which may be generated in the process of the invention are generally discharged to the ecoreactor.

The ecoreactor generally takes the form of a constructed wetland area containing a wide variety of microorganisms, plants and animals. The ecoreactor can comprise an integrated area or can be multiple separate areas, preferably graded from the influent end to the effluent end to facilitate gravity water drainage from a first area to the next.

Generally, the wetland environment comprises wetland plants indigenous to the area in which it is constructed, and the microorganisms that predominate are those which were generated in the bioreactor and are the products of survival and growth therein. The ecoreactor may be contained in a greenhouse like structure but generally is exposed to the weather and open to the natural environment. The principle function of the ecoreactor is the bioconversion and biofiltration of chemical complexes and biomass containing effluent which is discharged from the bioreactor. The result is the production of an ecologically beneficial humus material, which can support a high protein forage crop and a filtered low nutrient water.

The build-up of humus within the ecoreactor occurs gradually through the interaction of the many diversified microorganisms and wetland plants with the biomass of the effluent from the bioreactor. The root and stem systems of the various indigenous plants assist in capturing microbial solids and provide extensive surface area for further microbial growth. In turn, the entrapped microbial biomass provides a growth medium and substrate for the developing plant and animal biomass. As plants and animals die or are harvested, the organic material so produced becomes mixed with the living plant, animal and microbial biomass to produce a balanced humus material comprising complexed phosphorus and nitrogenous materials from the aqueous storm water runoff.

Humus material generated in the ecoreactor can contain a chemical and biological composition which will make it suitable and valuable for commercial use. It can be mixed with a variety of other inorganic materials such as sand, clay, gravel, etc., to produce a variety of different soils useful in agricultural, landscaping, forestry, and other ecological applications.

Fluid movement within the bioreactor and/or ecoreactor and/or various zones thereof can be controlled and directed by appropriate placement and operation of various collection and distribution pumps, pipes, wells, weirs, berms and the like. In many embodiments it is not been found necessary to isolate the material to be bioconverted to prevent migration into the surrounding environment, particularly in highway embodiments where the storm water runoff has been received through porous ditch arrangements. Generally however, the bioreactor and/or ecoreactor are easily isolated using an artificial or natural, impervious liner.

The process of the invention may further comprise a georeactor zone. Such zone generally comprises a filtering means such as varying layers of sand and gravel and the like and can be positioned under the ecoreactor such that aqueous effluent from the final areas of the ecoreactor will seep down into and through the georeactor zone and further filter aqueous effluent before its addition to the groundwater. The final aqueous effluent from the ecoreactor area will typically constitute appropriate quality for discharge into a receiving water of the surrounding environment. The wetland system constituting the ecoreactor provides effluent polishing and can constitute an appropriate environment for biomonitoring. A wide variety of native and other indicator plants and animals are maintained in this wetland in such a manner so as to provide continuous monitoring of effluent quality and compatibility with the receiving environment.

The bioreactor zone generally comprises an aerating means at or near the influent end thereof. The presence of aeration tends to foster creation of an aerobic zone within the bioreactor zone through air bubbling up which allows for zones having different dissolved oxygen levels and hence favors different microbial and other organismal populations. Natural currents created through the addition of influent and the agitating action of the aerator cause movement of the influent toward the aerator and development of an active biomass. It should be understood that mechanical mixing means and/or constructed means such as weirs, channels are also contemplated for use in the bioreactor.

The bioreactor is preferably from about 0.2 to about 10.0 meters deep and may be lined with an impervious liner such as plastic, clay or the like. Generally, the bioreactor is fed influent storm water runoff containing nitrogen, phosphorus and/or BOD from a system of pipes, ditches or the like arranged to collect same from the highway, field, municipality or the like. Solids settling in the bioreactor can be periodically removed for disposal or the bioreactor may be closed as a permanent disposal site.

The effluent from the bioreactor zone is cycled into the ecoreactor, which is preferably located adjacent the bioreactor zone. The ecoreactor contains maximally diversified populations of plants, animals and microorganisms, all living in an extensive variety of different sub-environments. Water depth within the ecoreactor can have an average depth varying from a few feet to less than about a centimeter. Preferably the average depth is from about 6 to about 12 inches.

One or more of the areas of an ecoreactor may comprise a georeactor zone thereunder or adjacent thereto such that water is allowed to seep from the ecoreactor through the georeactor zone to the groundwater aquifer.

In a preferred embodiment, the, ecoreactor is generally composed of separate but connected cells which allows a given cell to serve as a primary solids accumulator. When the cell becomes full, a second cell is converted into the primary solids accumulator and so on. As an individual cell becomes mature, its organismal population also goes through a natural evolution. The sludge which is initially deposited is subjected to a series of actions by other organisms. Plant growth becomes more extensive and animal populations emerge which act on the steadily accumulating organic plant material. All of this results in gradual bioconversion of the bioreactor sludge into an organic humus material.

Generally, after from three to six years, a cell may be disconnected from the ecoreactor flow pattern, allowed to dry and the plant and humus material collected for their value as fertilizer, soil enhancer, plant growth medium or the like.

I claim:

1. A process for the bioconversion of soluble and suspended organics from storm water runoff, consisting essentially of:

introducing an aqueous storm water runoff stream comprising insoluble debris, inorganic materials and an aqueous component comprising suspended potassium, phosphorus and nitrogen values containing materials and soluble potassium, phosphorus and nitrogen values containing materials, into a bioreactor having an aerobic zone and an anaerobic zone;

settling inorganic materials and insoluble debris in a generally anaerobic zone of said bioreactor;

treating said aqueous component of said stream with a metallic salt to form a precipitable phosphorus complex and having suspended phosphorus, potassium and nitrogen containing materials within said aqueous component;

conditioning, within said aerobic zone, said treated aqueous component in which a precipitable phosphorus complex has been formed to enhance the formation of facultative bacteria therein;

forming, within said aerobic and anaerobic zones, a biomass containing enhanced facultative bacteria sufficient to actively bioconvert soluble phosphorus, potassium and nitrogen materials contained within said aqueous component;

transporting said aqueous component containing enhanced facultative bacteria, bioconverted phosphorus, complexed and precipitable phosphorus, suspended phosphorus, suspended potassium and nitrogen materials, precipitatable potassium and nitrogen containing materials and bioconverted potassium and nitrogen materials to an ecoreactor;

bioconverting said transported aqueous component and precipitating a beneficial humus material containing complexed and bioconverted phosphorus, potassium and nitrogen containing organics; and, recovering or discharging water from said ecoreactor, said water containing phosphorus, potassium and nitrogen values in an amount reduced from the values introduced to said bioreactor.

2. The process of claim 1 wherein the environment of the bioreactor in which the soluble phosphorus material has been introduced is periodically modified to diversify the activity of identified bioconverting subsystems.

3. The process of claim 2 wherein a modified environment generates different sub-environments within a subsystem.

4. The process of claim 2 wherein the environment of a primary zone in which the soluble phosphorus material is being introduced in said bioreactor is periodically modified through the addition of nutrients and the adjustment of size, location and functionality of sub-environments within the subsystems.

5. The process of claim 1 comprising fluid recycles between multiple subsystems within the ecoreactor to enhance and encourage organism movement among combinations of subsystems and sub-environments.

6. The process of claim 1 wherein aqueous recovery from the bioreactor is introduced into a wetlands system constituting an ecoreactor comprising plants, animals, microorganisms which are indigenous to a local geographic environment.

7. The process of claim 6 where in said wetlands system comprises indicator organisms, which respond in growth, color or other characteristic to the presence or absence of generally known levels of phosphorus or nitrogen.

8. The process of claim 6 comprising at least one artificially constructed tanks, pools, streams and marshes.

9. Humus material, produced in the ecoreactor by the process of claim 1, containing more than about 0.5 percent of nitrogen, and more than about 0.2 percent of phosphorus and potassium, such material constituting a potting soil, topsoil, or other all naturally produced material suitable for soil amendment or plant production.

* * * * *